(12) United States Patent
Pope et al.

(10) Patent No.: US 8,075,377 B2
(45) Date of Patent: Dec. 13, 2011

(54) REAR ROTOR CONE

(75) Inventors: Glenn Pope, Viola, IL (US); Aaron Bruns, Davenport, IA (US)

(73) Assignee: Deere & Company, Moline, IL (US)

( * ) Notice: Subject to any disclaimer, the term of this patent is extended or adjusted under 35 U.S.C. 154(b) by 234 days.

(21) Appl. No.: 12/130,958

(22) Filed: May 30, 2008

(65) Prior Publication Data
US 2009/0209307 A1 Aug. 20, 2009

Related U.S. Application Data

(60) Provisional application No. 61/004,882, filed on Nov. 29, 2007.

(51) Int. Cl.
*A01F 7/06* (2006.01)
*A01F 12/18* (2006.01)
(52) U.S. Cl. ............................. 460/66; 460/67
(58) Field of Classification Search .................. 460/59, 460/63, 66–70, 73, 74, 79, 80, 84, 113, 114; 56/14.5, 14.6
See application file for complete search history.

(56) References Cited

U.S. PATENT DOCUMENTS

| | | | | |
|---|---|---|---|---|
| 1,907,035 A | * | 5/1933 | Baldwin | 460/65 |
| 2,493,105 A | * | 1/1950 | Bunting | 460/70 |
| 3,623,302 A | * | 11/1971 | Schmitt | 56/14.6 |
| 3,863,643 A | * | 2/1975 | DePauw | 460/66 |
| 3,976,084 A | | 8/1976 | Weber | |
| 3,982,549 A | * | 9/1976 | De Pauw et al. | 460/67 |
| 4,075,823 A | * | 2/1978 | Rowland-Hill | 56/14.6 |
| 4,244,380 A | * | 1/1981 | DePauw et al. | 460/108 |
| 4,310,004 A | | 1/1982 | De Busscher et al. | |
| 4,348,855 A | | 9/1982 | DePauw et al. | |
| 4,466,447 A | | 8/1984 | Hoefer et al. | |
| 4,470,420 A | | 9/1984 | Hanaway | |
| 4,531,528 A | | 7/1985 | Peters et al. | |

(Continued)

FOREIGN PATENT DOCUMENTS

DE 1941248 A1 2/1971

OTHER PUBLICATIONS

European Search Report dated Mar. 11, 2009 (5 pages).

*Primary Examiner* — Thomas Will
*Assistant Examiner* — Joan Misa
(74) *Attorney, Agent, or Firm* — Erickson Law Group, PC

(57) ABSTRACT

The invention provides an improved threshing and separating mechanism and method for a combine. The mechanism includes an elongated rotor mounted for rotation about a rotor axis within a rotor housing on the combine. The rotor has a threshing portion and a separating portion. The housing has a threshing section and a separating section corresponding to the threshing portion and the separating portion. The housing surrounds the rotor and is spaced from the rotor to form an annular space between the rotor and the housing for crop material to flow through in an axial crop flow direction from an inlet end of the housing to an outlet end of the housing. A rear portion of the rotor is tapered in a rearward direction to create an increased volume at the outlet of the rotor housing to prevent stagnation of flow of straw material in the transition of velocity between the housing outlet and the straw beater.

17 Claims, 6 Drawing Sheets

U.S. PATENT DOCUMENTS

| | | | |
|---|---|---|---|
| 4,875,891 A | 10/1989 | Turner et al. | |
| 4,964,838 A | 10/1990 | Cromheecke et al. | |
| 5,112,279 A | 5/1992 | Jensen et al. | |
| 5,344,367 A | 9/1994 | Gerber | |
| 5,376,047 A | 12/1994 | Harden et al. | |
| 5,445,563 A | 8/1995 | Stickler et al. | |
| 5,497,605 A | 3/1996 | Underwood et al. | |
| 5,498,206 A | 3/1996 | Underwood et al. | |
| 5,562,540 A * | 10/1996 | Balmer | 460/65 |
| 5,688,170 A | 11/1997 | Pfeiffer et al. | |
| 6,036,598 A | 3/2000 | Harden et al. | |
| 6,241,605 B1 * | 6/2001 | Pfeiffer et al. | 460/69 |
| 6,325,713 B1 * | 12/2001 | Haar et al. | 460/69 |
| 6,468,152 B2 | 10/2002 | Moriarty | |
| 6,672,957 B2 | 1/2004 | Voss et al. | |
| 6,884,161 B2 | 4/2005 | Moriarty | |
| 6,976,912 B2 * | 12/2005 | Gribbin | 460/66 |
| 7,001,268 B2 * | 2/2006 | Puryk et al. | 460/109 |
| 7,025,673 B2 | 4/2006 | Schmidt et al. | |
| 7,070,498 B2 | 7/2006 | Grywacheski et al. | |
| 2002/0002068 A1 * | 1/2002 | Welch | 460/71 |
| 2002/0128054 A1 | 9/2002 | Lauer | |
| 2005/0164755 A1 | 7/2005 | Nelson et al. | |

* cited by examiner

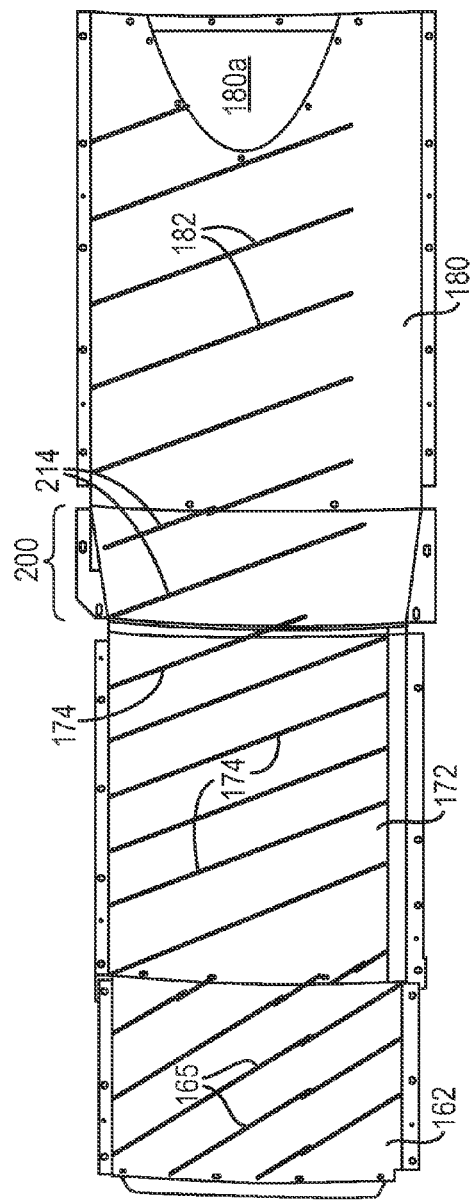
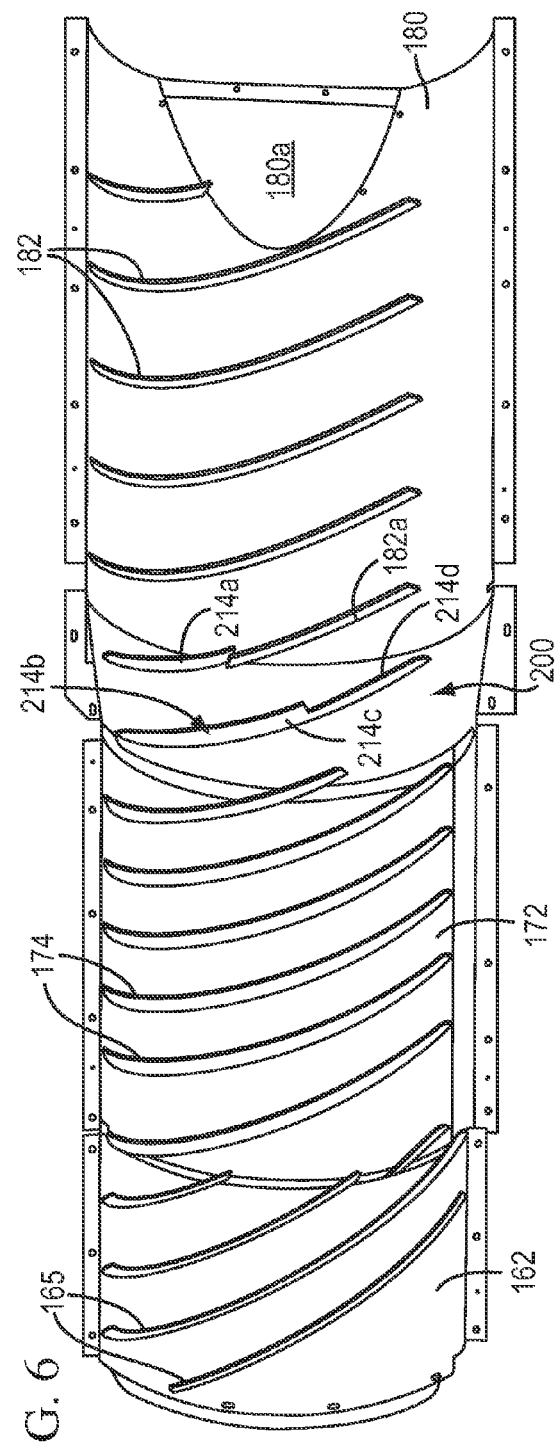
FIG. 5
FIG. 6

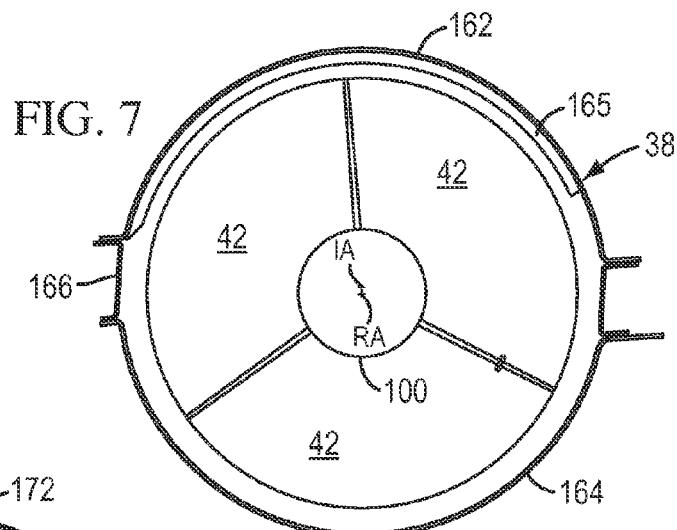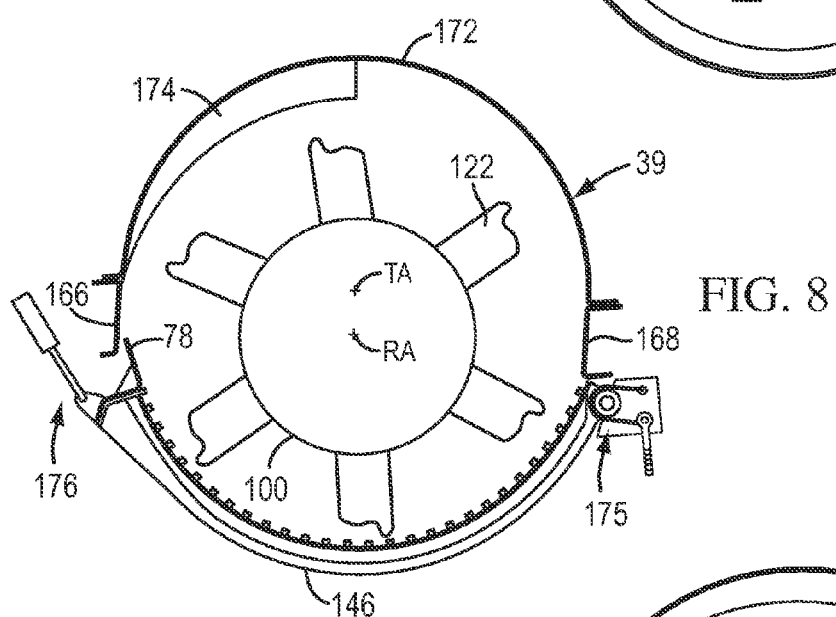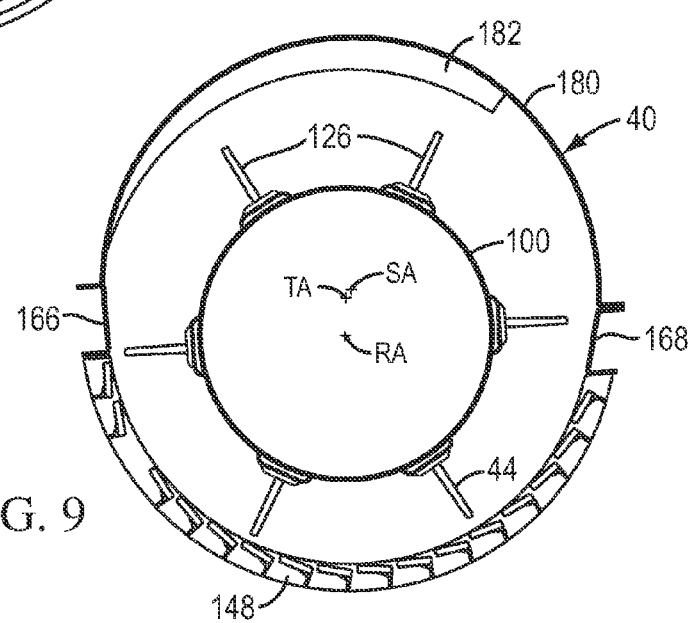

REAR ROTOR CONE

This application claims the benefit of U.S. provisional patent application Ser. No. 61/004,882 filed Nov. 29, 2007.

FIELD OF THE INVENTION

The invention relates to rotors and housings for axial rotary agricultural combines.

BACKGROUND OF THE INVENTION

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

Rotary combines have one or two large rotors for threshing and separating the harvested crop material. In most rotary combines the rotor or rotors are arranged along the longitudinal axis of the machine. These rotors are provided with an infeed section for receiving harvested crop material, a threshing section for threshing the harvested crop material received from the infeed section and a separating section for freeing grain trapped in the threshed crop material received from the threshing section.

Rotors have been provided for combines in a variety of configurations to optimize harvesting efficiency for a wide variety of crops and crop conditions. Examples are shown in U.S. Pat. Nos. 5,445,563 and 5,688,170 assigned to the assignee of the present application. These two patents both disclose rotary crop processing units having two or more sections. The relationship between the rotor axis and the housing axis varies from one section to the other. The rotor axis becomes increasingly offset from the housing axis in the crop flow direction from the housing inlet to the housing outlet. This is accomplished by abrupt transitions in the housing structure between sections where the housing shape changes. As the housing shape changes, the housing axis steps upward relative to the rotor axis and the gap between the rotor and the top of the housing increases at each step in the housing.

U.S. Pat. No. 7,070,498 describes a combine rotor having both infeed and threshing sections on a common frusto-conical portion of the rotor drum. The rotor in the infeed section is provided with helical infeed elements located on the fore-region of the frusto-conical portion of the drum. Immediately downstream from the infeed section, the threshing section is provided with a number of threshing elements. A portion of the threshing elements are attached to the aft-region of the frusto-conical portion of the drum, with the remaining portion being attached to the rearward cylindrical portion.

In such rotary combines, due to the shape and sizing of the housing covers, the rotor housing expands in steps as the material moves rearward. The first step is over the threshing area. The other expansion point is over the separator portion of the rotor.

The present inventors have recognized that when straw material exits from the rotor housing on a combine, there is typically some stagnation in the movement of the straw material as straw movement changes from a rotational direction to a linear direction into and through the discharge beater. This change in direction leads to loss of angular momentum and velocity which results in straw building up and congestion at the discharge point of the rotor housing. Extreme hesitation can result in a plug of the discharge of the rotor housing and the transition area, or in a failure of the surrounding housing and grates in the transition area. Current combines have a discharge paddle option to address material stagnation in this area. However, there is lacking a manner of fine-tuning the discharge paddles for proper material handoff to the discharge beater for different crops and conditions.

The present inventors have recognized that a need exists for providing a rotor housing for an axial rotary agricultural combine that provides for efficient and effective discharge of straw material, an increased wear life, and decreased damage to the straw.

SUMMARY OF THE INVENTION

The invention provides an improved threshing and separating mechanism for a combine. The mechanism includes an elongated rotor mounted for rotation about a rotor axis within a rotor housing on the combine. The rotor has a threshing portion and a separating portion. The housing has a threshing section and a separating section corresponding to the threshing portion and the separating portion. The housing surrounds the rotor and is spaced from the rotor to form an annular space between the rotor and the housing for crop material to flow through in an axial crop flow direction from an inlet end of the housing to an outlet end of the housing.

According to the preferred embodiment of the invention, a rear portion of the rotor tube is tapered in a rearward direction to create an increased volume at the outlet of the rotor housing to prevent stagnation of flow of straw material in the transition of velocity between the housing outlet and the straw beater.

The preferred embodiment of the invention provides a cone-shaped rear portion of the rotor tube to allow for more open volume between the rotor tube and the rotor housing to compensate for the material losing velocity and momentum at a rear of the rotor housing which will allow for better transition of crop flow from a rotational direction to a linear direction.

Numerous other advantages and features of the present invention will be become readily apparent from the following detailed description of the invention and the embodiments thereof, and from the accompanying drawings.

BRIEF DESCRIPTION OF THE DRAWINGS

FIG. 5 is a bottom view of the cover shown in FIG. 3;

FIG. 6 is a perspective bottom view of the cover shown in FIG. 3;

FIG. 7 is a sectional view taken generally along line 7-7 of FIG. 2;

FIG. 8 is a sectional view taken generally along line 8-8 of FIG. 2;

FIG. 9 is a sectional view taken generally along line 9-9 of FIG. 2; and

DETAILED DESCRIPTION OF THE PREFERRED EMBODIMENTS

Figure 1:
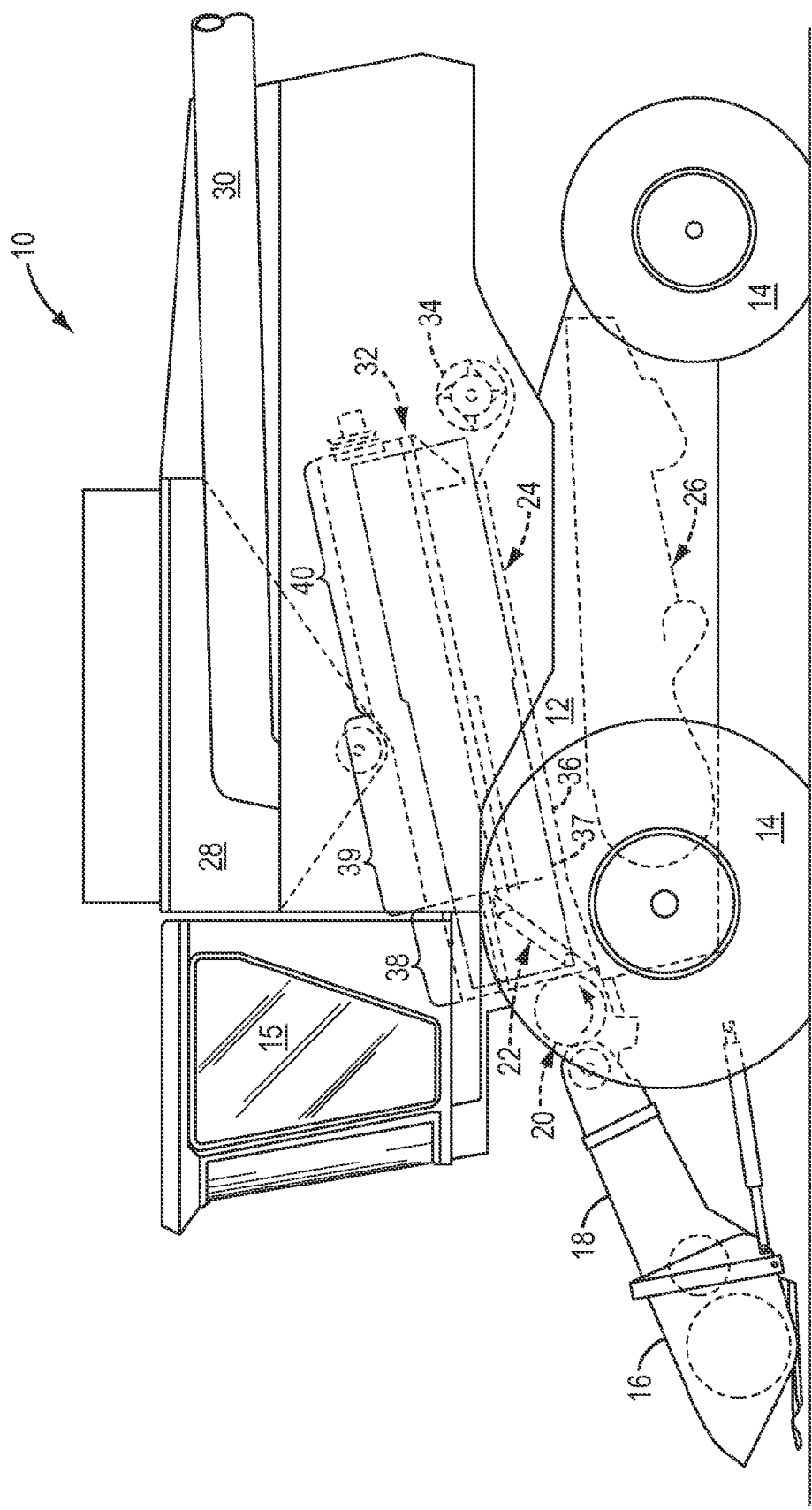
FIG. 1 is a diagrammatic side view of an agricultural combine the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 shows an agricultural combine 10 comprising a supporting structure 12 having ground engaging wheels 14 extending from the supporting structure. The operation of the combine is controlled from operator's cab 15. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24.

The crop processing unit 24 threshes and separates the harvested crop material. Grain and chaff fall through grates on the bottom of the unit 24 to the cleaning system 26. The cleaning system 26 removes the chaff and directs the clean grain to a clean grain elevator (not shown). The clean grain elevator deposits the clean grain in grain tank 28. The clean grain in the tank 28 can be unloaded into a grain cart or truck by unloading auger 30. Threshed and separated straw is discharged from the axial crop processing unit 24 through outlet 32 to discharge beater 34. The discharge beater 34 in turn propels the straw out the rear of the combine.

Figure 2:
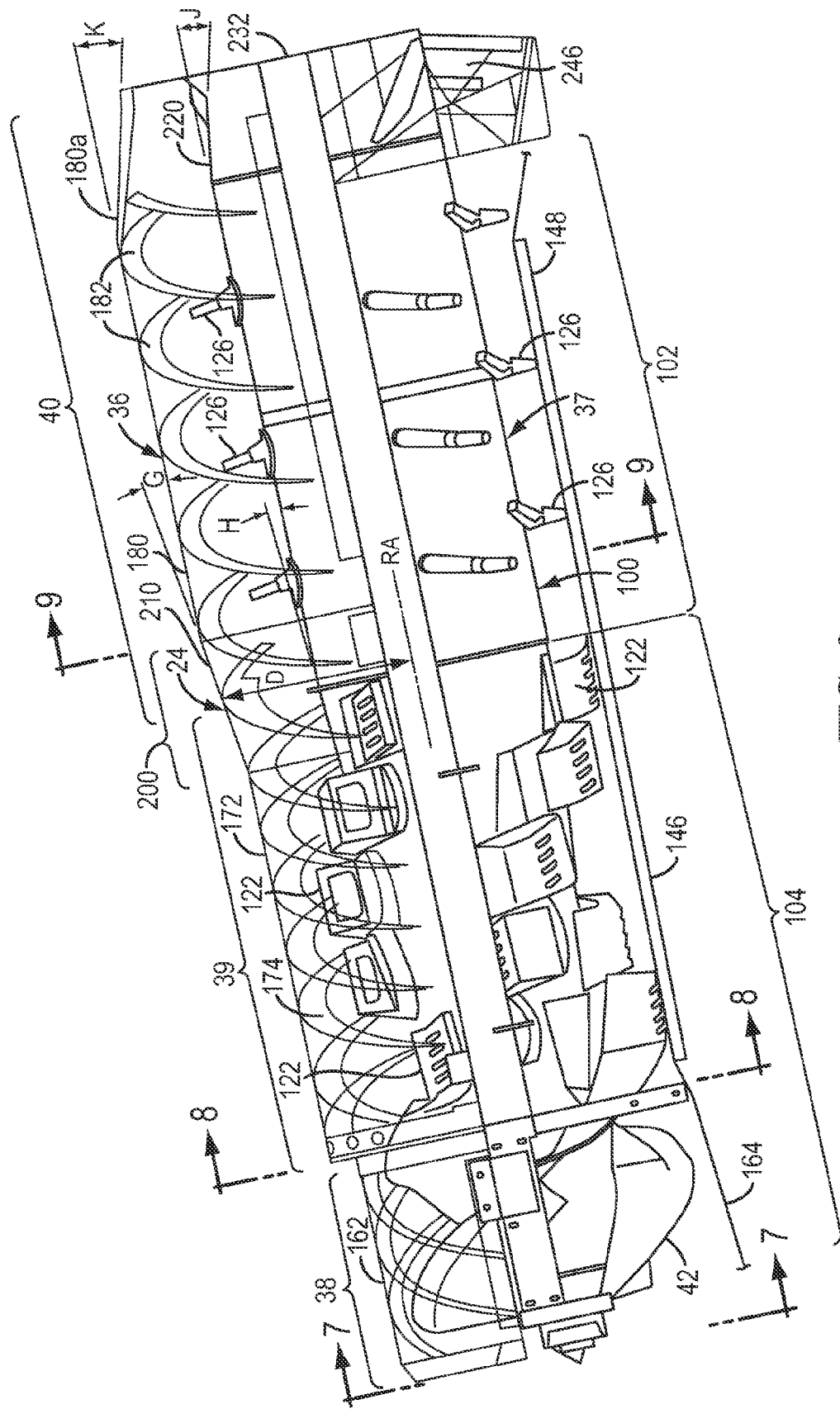
FIG. 2 is a diagrammatic side view of a crop processing unit taken from the combine shown in FIG. 1.
Figure 3:
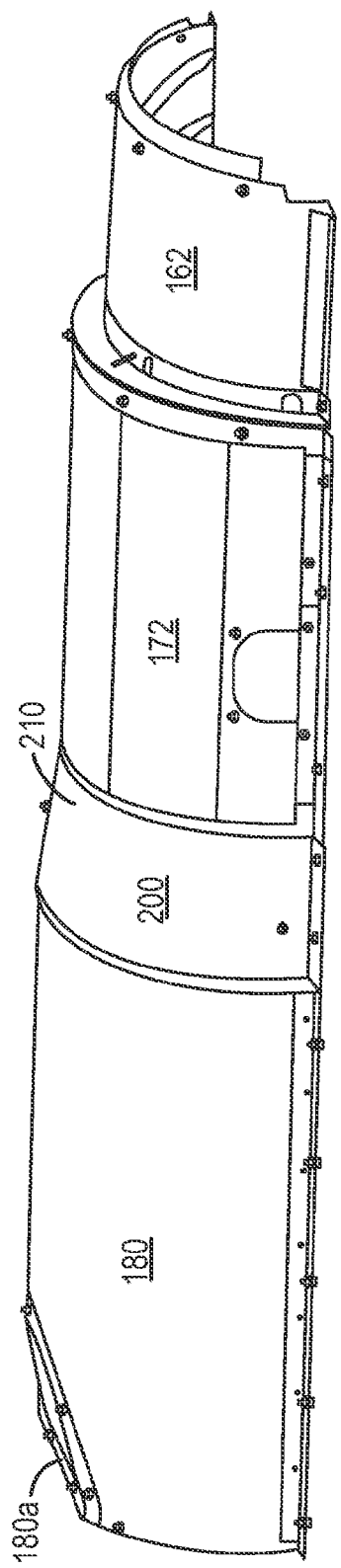
FIG. 3 is a perspective view of a cover for a crop processing unit of FIG. 2.
Figure 4:
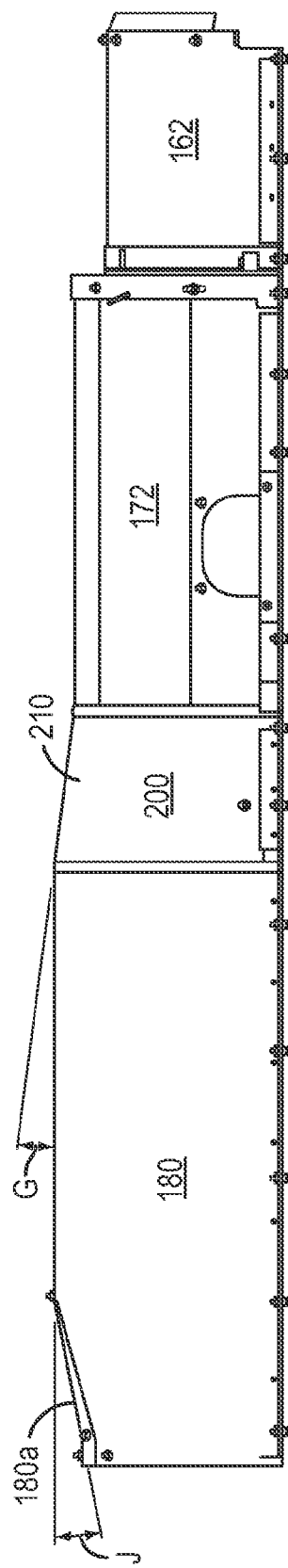
FIG. 4 is a side view of the cover shown in FIG. 3.

As illustrated in FIG. 2, the axial crop processing unit 24 comprises a rotor housing 36 and a rotor 37 located inside the housing 36. The front part of the rotor 37 and the rotor housing 36 define the infeed section 38 of the crop processing unit. Longitudinally downstream from the infeed section 38 are threshing section 39 and separating section 40. The rotor 37 comprises a drum 100 to which crop processing elements for the infeed section, threshing section, and separating section are affixed. The drum 100 comprises a rearward cylindrical portion 102 and a forwardly extending frusto-conical portion 104.

The rotor 37 shown in FIG. 2 is similar to the rotor explained in more detail in U.S. Pat. No. 7,070,498, herein incorporated by reference. However, in contrast to the rotor shown in U.S. Pat. No. 7,070,498, the rotor 37 within the threshing section 39 includes a long tapered profile throughout the threshing section 39 without the cylindrical portion within the threshing section as described in U.S. Pat. No. 7,070,498. Alternatively, the rotor could be a rotor having the shape such as shown U.S. Pat. No. 5,688,170. The invention is useful with and encompasses all of these rotors.

The rotor 37 in the infeed section 38 is provided with helical infeed elements 42 located on the frusto-conical portion of the drum 100. The helical infeed elements 42 engage harvested crop material received from the beater 20 and inlet transition section 22.

In the threshing section 39 the rotor 37 is provided with a number of threshing elements 122 for threshing the harvested crop material received from the infeed section 38.

The separating section 40 of the rotor includes outwardly projecting tines 126 similar to the tines disclosed in FIGS. 11 and 12 of U.S. Pat. No. 5,112,279, herein incorporated by reference.

The threshing section 39 of the rotor housing is provided with a concave 146 and the separating section 40 is provided with a grate 148. Grain and chaff released from the crop with a grate 148 falls through the concave 146 and the grate 148. The concave and grate prevent the passage of crop material larger than grain or chaff from entering the cleaning system 26.

The rotor is axially arranged in the combine and defines a central rotor axis RA. The rotor axis RA is a straight line passing through the infeed, threshing and separating portions of the rotor.

As seen in FIG. 7, the infeed section 38 of the rotor housing 36 is provided with a closed cover 162 and a closed bottom 164. The cover 162 is provided with helical indexing vanes 165. The cover and bottom are bolted to axial rails 166 and 168. The forward portion of the closed bottom 164 is provided with an inlet transition section which is similar to one of those disclosed in U.S. Pat. Nos. 7,070,498 or 5,344,367, herein incorporated by reference.

The closed cover 162 of the infeed section 38 defines an infeed axis IA. The infeed axis IA is parallel to and substantially collinear with the rotor axis RA defined by the rotor. As such, the infeed portion of the rotor is substantially concentrically arranged in the infeed section 38 of the rotor housing as defined by the cover 162.

As seen in FIG. 8, the threshing section 39 is provided with a closed threshing cover 172 having helical vanes 174. The cover is bolted to axial rails 166 and 168. The concave 146 is pivotally mounted to the frame of the combine below rail 168 at 175. An adjustment assembly 176 for adjusting concave clearance is mounted to the frame of the combine below rail 166. The concave 146 is provided with a closed extension 178.

The threshing cover 172 defines a threshing axis TA that is parallel to the rotor axis RA. The threshing axis is located above the rotor axis RA. In addition, the threshing axis is slightly offset to the side of the rotor axis in a downstream direction. As such, the cover of the threshing section is eccentrically arranged relative to the threshing portion of the rotor.

The separating section 40 is provided with a separating cover 180 having helical vanes 182. The cover is bolted to axial rails 166 and 168. Grate 148 is also bolted to rails 166 and 168. Grate 148 is similar to the grate disclosed in U.S. Pat. No. 4,875,891.

The separating cover 180 defines a separating axis SA that is parallel to the rotor axis RA. The separating axis is located above the rotor axis RA. In addition, the separating axis is offset to the side of the rotor axis in a downstream direction. As such, the cover of the separating section is eccentrically arranged relative to the separating portion of the rotor.

According to the preferred embodiment of the present invention, a frusto-conical transition section 200 is provided between the threshing section 39 and the separating section 40, overlapping each section.

The transition section 200 includes a cover 210 having a substantially frusto-conical curvature. The cover 210 includes vanes 214a, 214b. The vane 214a has a relatively wide width similar to the vanes 174 of the threshing section 39. The vane 214a is substantially continuous with the last vane 182a of the separating section 40. The vane 214b has a relatively wide width section 214c similar to the width of the vane 174 of the threshing section 39, and a relatively thinner width section 214d similar to the width of the vane 182 of the separating section 40.

Preferably, for smooth, energy-efficient flow, the cover 210 has a taper angle "G" that is substantially equal to a taper angle "H" of the rotor drum 100 within the threshing section 39 for the rotor shown in FIG. 2.

According to the present invention, the rotor tube 100 includes a taper portion or cone 220 at an outlet end of the processing unit 24 having an angle of taper "J." The portion is located beneath a deflecting plate 180a in the separator cover 180. Preferably the deflecting plate taper angle "K" is preferably substantially equal to the rotor angle "J."

Figure 10:
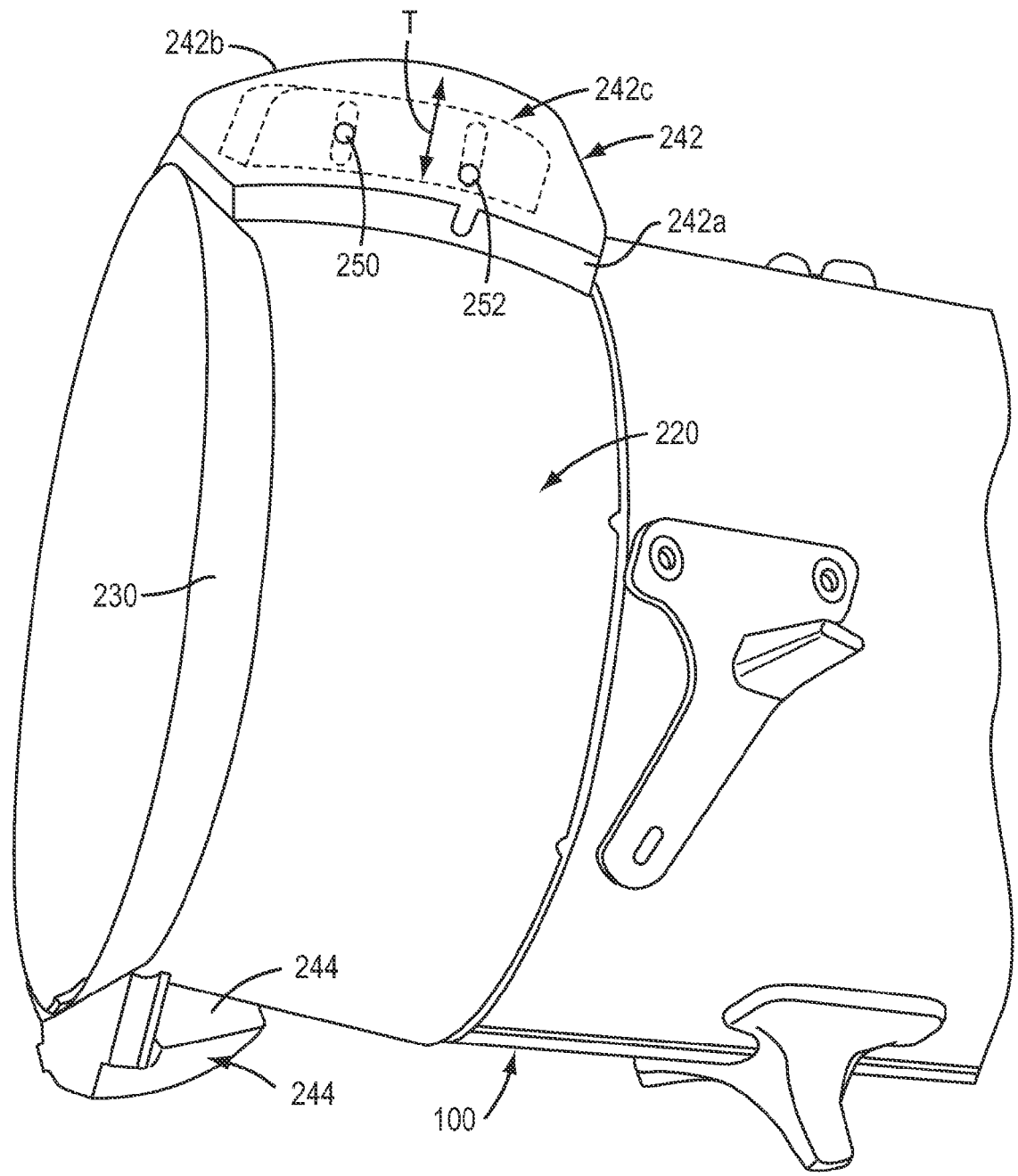
FIG. 10 is an enlarged fragmentary perspective view of a rear portion of the rotor shown in FIG. 2.

The taper portion 220 is shown in FIG. 10. The taper portion 220 is contiguous to a short reverse taper or radially expanding cone portion 230 that is adjacent to the end wall 232 (FIG. 2) of the housing. The two tapered portions extend along a length of the tube 100 that is substantially in registry with the outlet opening 232. Between the two tapered portions 220, 230 are two vanes 242, 244 that assist in the discharge of the straw material through a bottom directed outlet 246 (FIG. 2) of the rotor housing that directs straw to the discharge beater 34.

Each vane includes a welded on base portion 242a, 244a and an adjustable extending portion 242b, 244b. Each base portion 242a, 244a has a stem portion 242c, 244c that fits within a cavity within a respective extending portion 242b, 244b. The extending portions 242b, 244b can be pulled out a selective distance in the direction T from the base portions 242a, 244a and then two fasteners 250, 252 which penetrate holes in the extending portions 242b, 244b and which slide in slots in the stem portions 242c, 244c v can be tightened on the back side against the stem portions 242c, 244c to set the radial extent of the vanes 242, 244.

Alternately, for each vane 242, 244, the stem portion could not be in a cavity of the extending portion but could be on a back side of the extending portion and two fasteners could be used to either slide the extending portion evenly in the direction T with respect to the stem portion or to pivot the extending portions about one fastener to move only one end of the extending portion in the direction T. The fasteners are then tightened to set the radial extent of the extending portion.

Alternately, the extending portions are not adjustable per se but are replaceable with selectable extending portions of differing radial extents and the extending portions are merely fastened to the base portions.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A threshing mechanism for a combine having a supporting structure, the mechanism comprising:
   an elongated rotor for moving crop materials;
   an elongated housing for surrounding said elongated rotor and for defining a volume of space between said rotor and said housing, said housing having an outlet;
   said housing and said rotor mounted in said supporting structure wherein said housing is stationary with respect to said supporting structure and said rotor is mounted to rotate within said housing;
   a first portion of an outlet end of said rotor having a radial taper;
   a second portion of said outlet end of said rotor, said second portion having a radially expanding cone, and said second portion abuts said first portion and is positioned adjacent to said outlet to transfer crop material out of the housing;
   wherein crop material is contained within, and moves through, a substantially annular space between the housing and the first and second portion without any intervening wall between the elongated housing and the first and second portion of the outlet end of the rotor.

2. The threshing mechanism according to claim 1, wherein said rotor comprises a threshing portion and a separating portion each having a surface and each having elements extending away from the surface.

3. The threshing mechanism according to claim 2, wherein said housing, comprises: a threshing section and a separating section, the threshing portion of the rotor corresponding to the threshing section of the housing and the separating portion of the rotor corresponding to the separating section of the housing, and said outlet for discharging said crop materials.

4. The threshing mechanism according to claim 1, wherein the second portion is shorter than the first portion.

5. The threshing mechanism according to claim 1, wherein said housing comprises: a flat deflecting plate at a top portion of an outlet end of said housing, said deflecting plate angles downward toward said outlet.

6. The threshing mechanism according to claim 5, wherein said downward angle of said deflecting plate substantially equals a taper angle of said first portion of said rotor.

7. A threshing mechanism for a combine having a supporting structure, the mechanism comprising:
   an elongated rotor for moving crop materials;
   an elongated housing for surrounding said elongated rotor and for defining a volume of space between said rotor and said housing, said housing having an outlet;
   said housing and said rotor mounted in said supporting structure wherein said housing is stationary with respect to said supporting structure and said rotor is mounted to rotate within said housing; and
   a means of increasing said volume in an outlet end portion of said housing wherein said means comprises a first portion of an outlet end of said rotor having a radial taper and a second portion having a radially expanding cone; said second portion abuts said first portion and is positioned adjacent to said outlet to transfer crop material out of the housing;
   wherein crop material is contained within, and moves through a substantially annular space between the housing and the first and second portions without any intervening wall between the elongated housing and the first and second portions of the outlet end of the rotor.

8. The threshing mechanism according to claim 7, wherein the second portion is shorter than the first portion.

9. The threshing mechanism according to claim 7, wherein said housing comprises a flat deflecting plate at a top portion of an outlet end of said housing; said deflecting plate angles downward toward said outlet.

10. The threshing mechanism according to claim 9, wherein said downward angle of said deflecting plate substantially equals a taper angle of said first portion of said rotor.

11. A combine having a rotary threshing mechanism, the mechanism having a housing surrounding a rotor, defining a volume of space between the rotor and the housing, and moving crop materials toward an outlet end of said housing, the improvement comprising:
   a first portion of an outlet end of said rotor having a radial taper;
   a second portion of said outlet end of said rotor, said second portion having a radially expanding cone, and said second portion abuts said first portion and is positioned adjacent to said outlet to transfer crop material out of the housing;
   said housing and said rotor are mounted in a supporting structure, wherein said housing is stationary with respect to said supporting structure and said rotor is mounted to rotate within said housing; and
   wherein crop material is contained within, and moves through, a substantially annular space between the housing and the first and second portions without any intervening wall between the housing and the first and second portions of the outlet end of the rotor.

12. The improvement according to claim 11, wherein said rotor comprises a threshing portion and a separating portion each having radially extending elements.

13. The improvement according to claim 12, wherein said housing, comprises: an outlet for discharging said crop materials, a threshing section and a separating section, the threshing portion of the rotor corresponding to the threshing section of the housing and the separating portion of the rotor corresponding to the separating section of the housing.

14. The improvement according to claim 11, wherein the second portion is shorter than the first portion.

15. The improvement according to claim 11, wherein said housing comprises: a flat deflecting plate at a top portion of an outlet end of said housing, said deflecting plate angles downward toward said outlet.

16. The threshing mechanism according to claim 15, wherein said downward angle of said deflecting plate substantially equals a taper angle of said first portion of said rotor.

17. A method of moving crop material through a threshing mechanism of a combine comprising the steps of:
   providing a rotor;
   providing an elongated housing surrounding said rotor to define a crop material area, wherein said housing is stationary with respect to a supporting structure and wherein said rotor rotates with respect to the housing;
   feeding crop materials into an inlet of said housing;
   moving the crop material in a rotary manner toward a housing outlet by rotating the rotor with respect to the housing;
   increasing the volume of the crop material area at an end portion of said housing by providing a first portion of an outlet end of said rotor with a radial taper and a second portion with a radially expanding cone, wherein said second portion abuts said first portion and is positioned adjacent to said housing outlet;
   containing crop material within and moving through a substantially annular space between the housing and the first and second portions without any intervening wall between the housing and the first and second portions of the outlet end of the rotor;
   diverting the direction of crop material at the crop material area in a direction away from a central rotor axis before said crop material is discharged;
   maintaining the direction of crop material in the direction away from the central rotor axis while moving the crop material at the outlet end of the rotor directly against the elongated housing.

* * * * *